March 27, 1962 V. C. TSIEN 3,026,892
ELECTROHYDRAULIC SERVO VALVE
Filed June 26, 1957 2 Sheets-Sheet 1
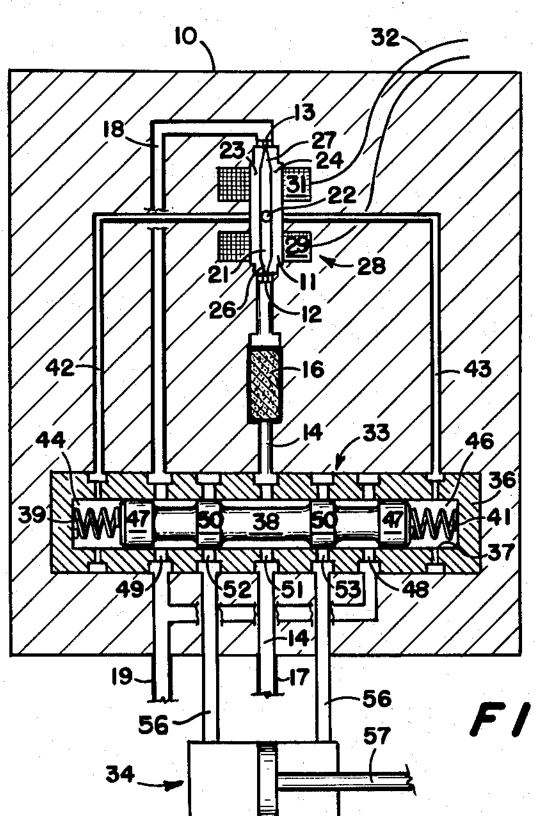
FIG. 1
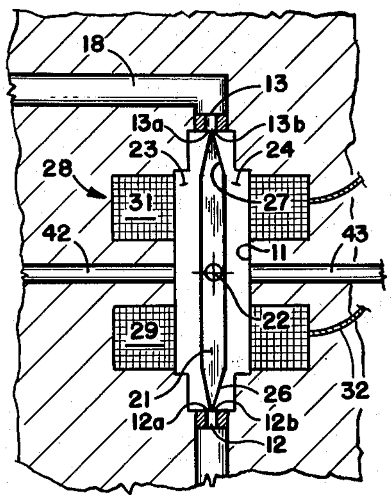
FIG. 1a
FIG. 4
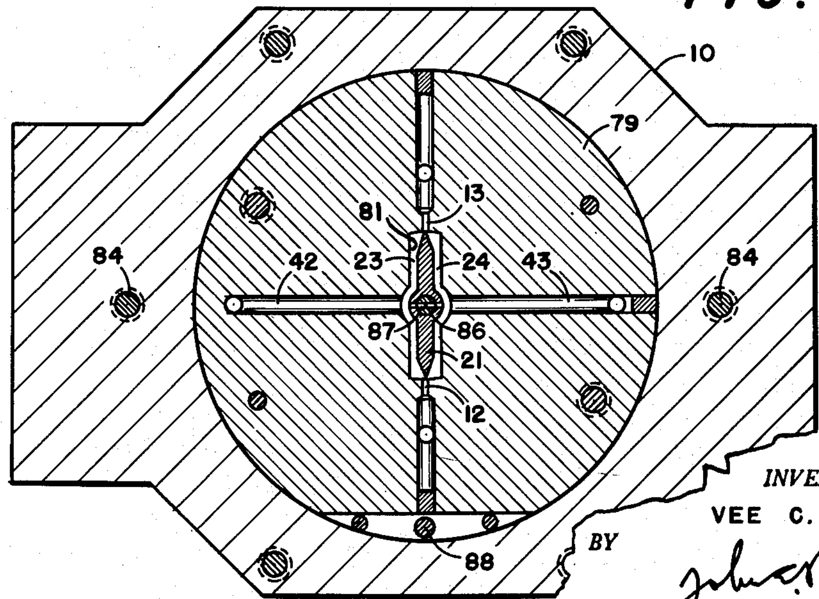
INVENTOR.
VEE C. TSIEN
BY [signature]
ATTORNEY March 27, 1962 V. C. TSIEN 3,026,892
ELECTROHYDRAULIC SERVO VALVE
Filed June 26, 1957 2 Sheets-Sheet 2
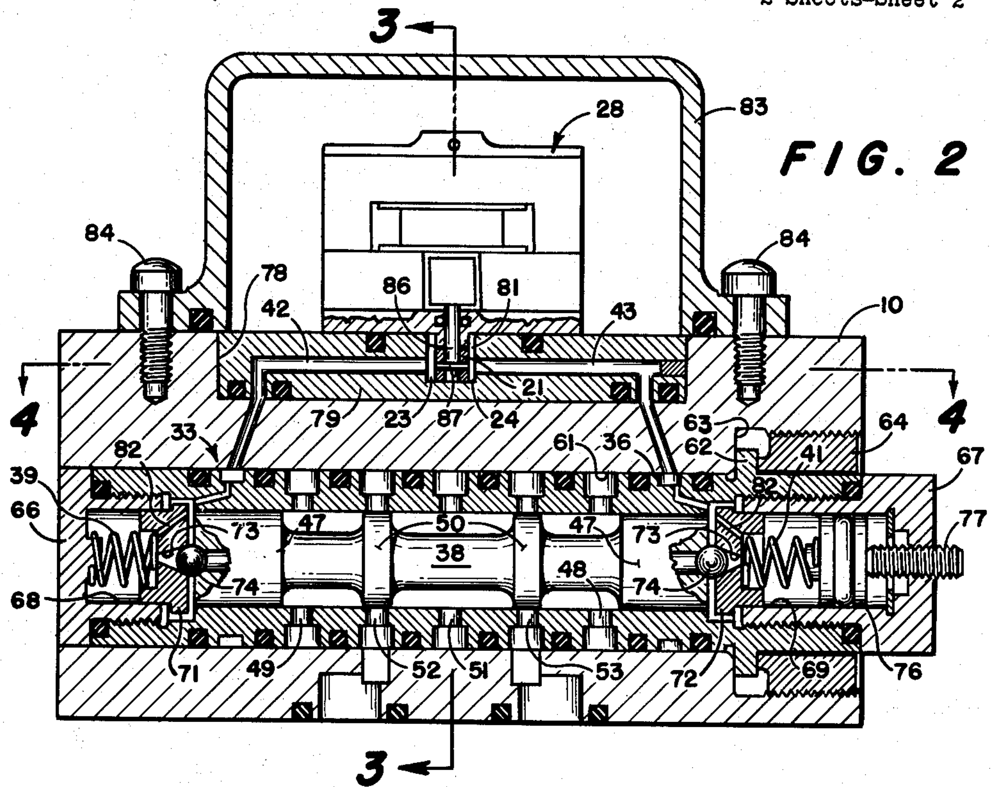
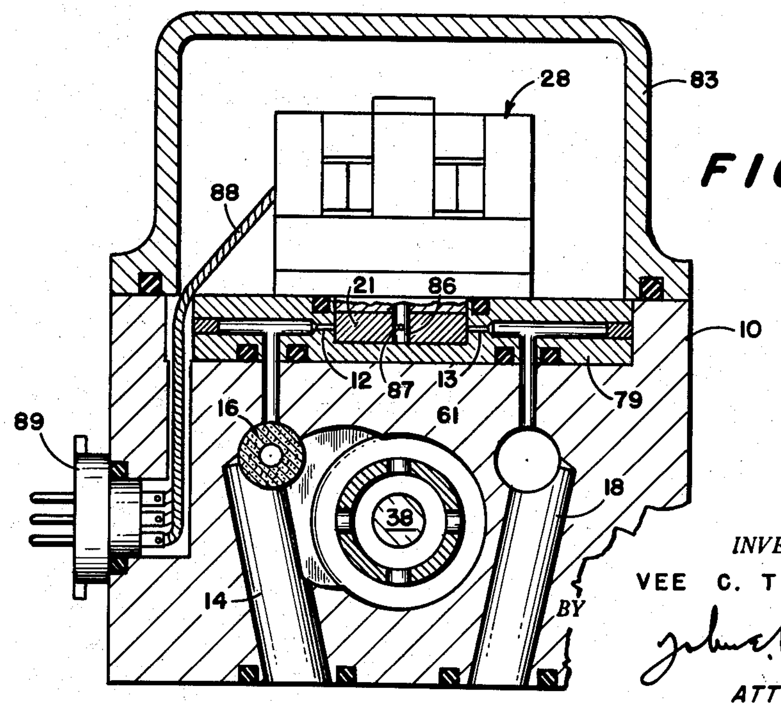
INVENTOR.
VEE C. TSIEN
BY
ATTORNEY United States Patent Office 3,026,892

Patented Mar. 27, 1962

3,026,892

ELECTROHYDRAULIC SERVO VALVE

Vee C. Tsien, Kalamazoo, Mich., assignor, by mesne assignments, to PneumoDynamics Corporation, Cleveland, Ohio, a corporation of Delaware Filed June 26, 1957, Ser. No. 668,261
5 Claims. (Cl. 137—82)

This invention relates to a fluid control device and more particularly to a new and improved electrohydraulic valve for fluid motors.

Electronic development has progressed to a degree which permits accurate sensing of conditions and the production of accurately controlled electric signals. In a power system controlled by electric devices, however, it is necessary to convert the control signal into usable controlled power. Systems are often utilized in which the power device is of a hydraulic nature and the sensing or signaling device is of an electronic nature. To convert the electric signal accurately into hydraulic power introduces many problems and the accuracy of the conversion is extremely important to the accuracy of the system. In a device according to this invention electric signals are utilized to produce controlled flow of liquids under pressure wherein the response to signal variations is both rapid and accurate.

It is an important object of this invention to provide a hydraulic control device which is capable of accurately producing hydraulic pressure differentials in response to electric signals of a small magnitude.

It is another important object of this invention to provide a new and improved fluid control device which can be utilized to accurately operate fluid motors or the like in response to electric signals.

Still another object of this invention is to provide a new and improved two stage electrically operated fluid control valve.

Further objects and advantages will appear from the following description and drawings, wherein:

FIGURE 1 is a schematic view of a preferred fluid control device according to this invention illustrating the function and operation of the device;

FIGURE 1*a* is an enlarged schematic view showing the orifice arrangement;

FIGURE 2 is a side elevation in a longitudinal section showing the structural details of one physical embodiment of a controlled device according to this invention;

FIGURE 3 is a section taken along 3—3 of FIGURE 2 and;

FIGURE 4 is a section taken along 4—4 of FIGURE 2.

A fluid control device according to this invention is particularly adapted for the use in controlling the operation of fluid motors or the like in response to electronic signals. One such installation would be found in the flight control system for aircraft in which hydraulic actuators provide the direct power to control the aircraft flight control surface wherein the operation of the actuator is responsive to the signal generated by the electronic equipment such as the automatic pilot, radar fire control or the like. In such a system, it is necessary to provide extremely accurate responses to relatively small electric signals so that the system will operate in an efficient manner.

A clear understanding of the functional operation of a control device can be readily obtained from the schematic illustration in FIGURE 1 wherein the control device is provided with a body 10 in which is formed a control cavity 11 supplied with hydraulic fluid under pressure through an inlet orifice 12 and from which fluid is exhausted through an outlet orifice 13. Fluid under pressure is supplied to the inlet orifice 12 from any suitable source of hydraulic fluid under pressure, such as a pump, by a pressure conduit 17 which connects to a passage 14 containing a filter 16. The outlet orifice 13 is connected to a reservoir return through a passage 18 and a suitable conduit 19. If liquid under pressure is supplied to the inlet orifice 12, it passes through the cavity 11 and returns to the reservoir through the outlet orifice 13. It should be understood that the control device requires continuous flow through the cavity 11 and that the control is accomplished by modifying this flow in such a way as to operate an associated fluid motor in a manner responsive to the conditions created by the flow modifications.

Within the cavity 11 is a vane 21 pivoted for rotation around a central axis 22 which divides the cavity 11 into a first chamber 23 and a second chamber 24 and is proportioned so that if the vane is in the neutral position shown, the pressure in both of the chambers 23 and 24 will be equal. The ends of the vane are formed with knife edges 26 and 27, one of which is positioned in alignment with and adjacent to each of the orifices 12 and 13 when the vane is in the neutral position. Therefore, the flow into the cavity 11 is divided by the upstream edge 26 of the vane 21 as it enters the cavity 11 through the inlet orifice 12. At the same time the downstream edge 27 is positioned adjacent to and in alignment with the outlet orifice 12 so the flow through the cavity 11 passes through the two chambers 23 and 24 and out through the outlet orifice 13. Reference should now be made to FIGURE 1*a* for a clear understanding of the flow characteristics. The forward edge 26 in effect divides the inlet orifice 12 into two variable orifices **12*a* and 12*b* which communicate with the two chambers 23 and 24 respectively. The downstream edge 27 also divides the outlet orifice 13 into two variable orifices 13*a* and 13*b* respectively. Of course the total area of the two orifices 12*a* and 12*b* equals the area of the inlet orifice 12 and the total area of the orifices 13*a* and 13*b* equals the area of the outlet orifice 13. When the vane is in the neutral position shown, the orifice 12*a* equals the orifice 12*b* and the orifice 13*a* equals the orifice 13*b* so the flow through the two chambers 23 and 24 is equally divided. If, however, the vane 21 is rotated in a clockwise direction the area of the orifice 12*a* is decreased restricting the entry of fluid into the first chamber 23 and at the same time the exhaust from the first chamber 23 through the outlet orifice 13*a* becomes less restricted. Therefore, the pressure in the first chamber drops. This same movement of the vane 21 increases the area of the orifice 12*b* and decreases the area of the orifice 13*b* so the flow into the second chamber 24 becomes less restricted and flow out of the second chamber becomes more restricted to increase the pressure in the second chamber 24. Such rotation, therefore, causes the pressure within the first chamber 23 to decrease and the pressure of the liquid within the second chamber 24 to increase thus producing a differential pressure between the two chambers 23 and 24 which is a function of the rotational of displacement of the vane 21 from the neutral position. Because both the inlet and exhaust orifice areas of each chamber are varied by rotation of the vane, the device is more sensitive to vane movement than it would be if only the upstream or downstream orifices were ,changed. Therefore, very small movements of the vane 21 will create effective pressure differentials between the two chambers. Again since the pivot axis 23 of the vane is in the center of the vane the forces on the vane created by the pressure within the chambers 23 and 24** are balanced and, therefore, only small forces are necessary to cause movement of the vane.

In order to produce rotation of the vane 21 from the neutral position shown, an electrical force or torque motor 28 is provided as schematically shown, by coils 29 and 31 which are connected to the source of an electrical control signal by leads 32. The force motor is designed so that it will produce a rotational displacement of the vane 21 from the neutral position which is a function of the magnitude of the control signal supplied wherein the direction of rotation is a function of the polarity of the signal. Therefore, the position of the vane 21 is determined by the applied electric signal. Normally the torque motor will be provided with means, such as springs, to center the vane 21 when no signal is present.

In some cases it may be desirable to operate an associated fluid motor or other device which is sensitive to differential pressure and in such a case, the associated mechanism would be connected directly to the two chambers 23 and 24. However, in the preferred system, the pressure differential created by the two chambers 23 and 24 is utilized to control the operation of a spool valve 33 which in turn controls fluid flow and directly controls a fluid motor 34 which in the illustrated case is a piston and cylinder fluid motor. It should be understood that any type of fluid motor can be controlled by a device according to this invention and that the particular type shown at 34 is merely illustrative of one of the more common types of fluid motors. The spool valve 33 includes a sleeve 36 formed with a cylindrical bore 37 in which is positioned a spool 38. Positioned between the ends of the bore 37 and the spool 38 are centering springs 39 and 41 which oppose each other and normally maintain the spool 38 in the neutral position shown. Two passages 42 and 43 connect the chambers 23 and 24 to the ends 44 and 46 of the bore 37 respectively. Therefore, if the pressures of the liquid within the chambers 23 and 24 are equal, equal fluid forces will be produced on the spool 38 and it will remain in its neutral position. If, however, the pressure within the chamber 23 is greater than the pressure within the chamber 24, there will be a resulting fluid force urging the spool 38 to the right against the centering force of the springs 39 and 41. The resulted force to the right will be a function of the pressure differential between the two chambers 23 and 24 which is in turn a function of the electric signal supplied to the force motor 28. The spool 38 will move to the right under such a resulting force a distance which is a function of the magnitude of the force so the operation of the spool is a function of the signal.

The spool 38 is formed with symmetrical end lands 47 and spaced center lands 50. The sleeve 36 is formed with outlet ports 48 and 49 open to the zone between the lands 47 and 50 which are connected to the reservoir return passage 18. Therefore, the zones around the spool 38 between the lands 47 and 50 is maintained at reservoir return pressure. Centerally located in the sleeve 36 is an inlet port 51 which is open to the zone between the two center lands 50 and connected to the inlet passage 14. Therefore, the zone between the two lands 50 is maintained at supply pressure. A pair of control ports 52 and 53 are formed in the sleeve 36 and are arranged so that they are covered by the lands 50 when the spool 38 is in the neutral position shown. These two control ports 52 and 53 are connected to opposite ends of the cylinder 54 of the fluid motor 38 by suitable pressure lines 56. Therefore, when the spool 38 is in the neutral position, the ends of the cylinder 54 are isolated from both the source of fluid under pressure and the reservoir return. If, however, the spool 38 moves to the right, fluid communication is established between the inlet port 51 and the control port 53 and at the same time fluid communication is established between the control port 52 and the reservoir return port 49. When this occurs, the piston 57 moves to the left in the cylinder 54 with the rate of such movement being dependent upon the rate of flow through the spool valve. The ports of the spool valve should be designed so that the rate of flow through the spool valve is a function of the displacement of the spool from the neutral position so that the rate of operation of the fluid motor 34 will be a function of the electric signal supplied to the force motor 28. If the opposite polarity of electric signal is supplied to the torque motor 28, the spool 38 will shift to the left causing an opposite connection to be made in the spool valve which will cause movement of the piston 57 to the right wherein the velocity of piston movement will again be a function of the magnitude of the control signal.

Reference should now be made to FIGURES 2 through 4 for the specific structure of an electrohydraulic control according to this invention. The structure in these figures is merely a production embodiment of the device shown in the schematic view of FIGURES 1 and 1*a*, therefore, the same reference numerals will be used wherever possible. The body 10 is formed with a bore 61 in which the sleeve 36 of the spool valve 33 is positioned. The sleeve 36 is formed with a radial 62 held against a radial wall 63 formed in the body 10 by a nut 64 threaded into the body 10 so that the sleeve is axially positioned within the body 10 by engagement on both sides of the flange 62. The ends of the sleeve 36 are closed by end members 66 and 67 which are threaded into the end of the sleeve and provided with bores 68 and 69 in which the springs 39 and 41 respectively are positioned. The springs engage floating members 71 and 72 which are formed with conical recesses 73 which receive ball thrust bearings 74 that engage the ends of the spool 38. In order to provide adjustment of the neutral position of the spool 38 I provide an adjustable spring stop 76 against which the spring 41 is seated and an adjustment screw 77 threaded through the end member 67 engaging the spring stop 76. By simply rotating the screw 77 it is possible to move the spring stop 76 and adjust the neutral position of the spool 38.

The upper face of the body 10 is formed with a circular recess 78 in which is positioned a plate 79 formed with a vane receiving cavity 81 divided into the first and second chambers 23 and 24 by the vane 21. The first chamber 23 is connected to the left end of the spool through a series of passages 42 formed in the plate 79, body 10 and the sleeve 36. The chamber 24 is similarly connected to the right end of the spool 38 by a series of passages 43 also formed in the same elements. Each of the floating members 71 and 72 is provided with passages 82 open therethrough so that both sides of the floating member will be under the same pressure which is the pressure in the associated chamber 23 or 24. The plate 72 is secured by a cap member 83 which is bolted to the body 10 by bolt fasteners 84 and provides a cover for the torque motor 28. The torque motor is provided with an output shaft 86 on which the vane is mounted by a cross pin 87 so that the vane is fixed relative to the output shaft 86. As mentioned previously, an increase in the pressure of the chamber 23 over the pressure in the chamber 24 produces movement of the spool 38 to the right which connects the control port 52 to the outlet port 49 and at the same time connects the control port 53 to the inlet port 51. As shown in FIGURE 3, the plate 79 is formed with the two orifices 12 and 13 respectively which are connected to the inlet passage system 14 and the outlet passage system 18 which are in turn connected to a source of pressure fluid and a reservoir return respectively. The torque motor 28 is provided with suitable electric leads 88 and a disconnect plug 89 by which it can be connected to a signal originating system external of the device. Suitable fluid seals of the O-ring type may be used at all points where fluid seals are necessary to prevent leakage.

Those skilled in the art will recognize that a structure according to this invention will provide extremely accurate and rapid conversion of electrical signals to fluid flows which are responsive to signals having a very small magnitude. Because the flow through the chambers 23 and 24 is controlled by inlet and outlet orifices the device will be sensitive to very small movements of the vane. Also since the vane is symmetrical the pressures within the two chambers will not have an adverse effect on the vane position of small control forces and will be capable of producing proper responses.

Although the preferred embodiment of this invention is illustrated, it will be realized that various modifications of the structural details may be made without departing from the mode of operation and the essense of the invention. Therefore, except insofar as they are claimed in the appended claims, structural details may be varied widely without modifying the mode of operation. Accordngly, the appended claims and not the aforesaid detailed description is determinative of the scope of the invention.

I claim:

1. A fluid controller comprising a body formed with a cavity, an inlet orifice through which fluid flows into said cavity, an exhaust orifice through which fluid flows out of said cavity, a vane pivoted in said cavity dividing it into first and second chambers both connected to said inlet and exhaust orifices, said vane being formed with an upstream edge adjacent to said inlet orifice movable by rotation of said vane to control the division of flow therefrom into said chambers and a downstream edge adjacent to said outlet orifice movable by said rotation to control the division of flow from said chambers into said outlet orifice, and means rotating said vane, the vane being movable only to positions in which the inlet orifice is at all times in communication with the first and second chambers and the exhaust orifice is at all times in communication with the first and second chambers, a first passage in the body always in communication with the first chamber, a second passage in the body always in communication with the second chamber, the first and second pasages together reflecting the difference in pressure between the first and second chambers.

2. A flow control comprising a body formed with a cavity, an inlet orifice through which fluid flows into said cavity, an exhaust orifice through which fluid flows out of said cavity, a symmetrical vane centrally pivoted in said cavity dividing it into first and second chambers both connected to said inlet and exhaust orifices, said vane being formed with an upstream edge adjacent to said inlet orifice movable to control the division of flow therefrom into said chambers and a downstream edge adjacent to said outlet orifice movable to control the division of flow from said chambers into said outlet orifice, and means for moving said vane in response to an external signal, the vane being movable only to positions in which the inlet orifice is at all times in communication with the first and second chambers and the exhaust orifice is at all times in communication with the first and second chambers, a first passage in the body always in communication with the first chamber, a second passage in the body always in communication with the second chamber, the first and second passages together reflecting the difference in pressure between the first and second chambers.

3. A fluid motor control comprising a body formed with a cavity, an inlet orifice through which liquid flows into said cavity, an exhaust orifice through which liquid flows out of said cavity, a vane pivoted in said cavity dividing it into first and second chambers both connected to said inlet and exhaust orifices in all positions of said vane, movement of said vane from a mid-position creating a pressure differential between said chambers, means for moving said vane in response to an external signal, and a valve operably connected to said chambers actuated by pressure differentials between said chambers to control the rate of flow to the fluid motor.

4. A fluid regulator comprising a body formed with a cavity, opposed inlet and outlet orifices open to said cavity producing fluid entry and exhaust therefrom, a vane pivoted on said body dividing said cavity into first and second chambers both connected to said inlet and exhaust orifices, said vane formed with an end adjacent to each orifice dividing the flow between each chamber and said orifice, and means for rotating said vane restricting flow from said inlet orifice into said first chamber and widening the restriction of flow out of said first chamber through said outlet orifice and simultaneously widening the restriction to flow into said second chamber from said inlet orifice and restricting the flow from said second chamber through said outlet orifice thereby causing the pressure in said first chamber to approach the pressure in said outlet orifice and causing the pressure in said second chamber to approach the pressure in said inlet orifice, the vane being movable only to positions in which the inlet orifice is at all times in communication with the first and second chambers and the exhaust orifice is at all times in communication with the first and second chambers, a first passage in the body always in communication with the first chamber, a second passage in the body always in communication with the second chamber, the first and second passages together reflecting the difference in pressure between the first and second chambers.

5. A fluid regulator comprising a body formed with a cavity, a vane member pivotally within said cavity on an axis equally spaced from the ends thereof to form a first chamber and a second chamber, an inlet and an outlet orifice open to the first and second chambers with the inlet orifice adjacent one end and the outlet orifice adjacent to the other end of said vane, said vane ends shaped to normally divide the fluid flow from said inlet to said outlet orifice equally on both sides of said vane, the vane being movable only to positions in which the inlet orifice is at all times in communication with the first and second chambers and the outlet orifice is at all times in communication with the first and second chambers, said vane upon its pivoted displacement on said axis restricting flow from said inlet orifice into the first chamber and widening the restriction of flow from the first chamber through said outlet orifice and simultaneously widening the restriction of flow from said inlet orifice into the second chamber and restricting the flow from the second chamber through said outlet orifice, fluid conveying means leading from the first and second chambers to motor means intended to be actuated by fluid pressure differentials between the first and second chambers, and power means imparting pivoted movement to said vane.

References Cited in the file of this patent

UNITED STATES PATENTS

| | | |
|---|---|---|
| 253,171 | Ridgway | Jan. 31, 1882 |
| 2,139,878 | Carlson | Dec. 13, 1938 |
| 2,388,890 | Whitted | Nov 13, 1945 |
| 2,283,753 | Harcum | May 19, 1952 |
| 2,591,800 | Gardiner | Apr. 8, 1952 |
| 2,655,940 | Jackson | Oct. 20, 1953 |
| 2,709,421 | Avery | May 31, 1955 |
| 2,767,689 | Moog | Oct. 23, 1956 |
| 2,823,689 | Healy | Feb. 18, 1958 |
| 2,835,265 | Brandstadter | May 20, 1958 |
| 2,849,013 | Callender | Aug. 26, 1958 |

FOREIGN PATENTS

| | | |
|---|---|---|
| 552,743 | France | May 5, 1923 |
| 907,650 | France | Mar. 18, 1946 |
| 117,314 | Sweden | Sept. 24, 1946 |
| 469,627 | Italy | Mar. 10, 1952 |